July 14, 1925.
A. J. MACY
1,545,589
STEREOSCOPIC MOTION PICTURE APPARATUS
Filed Nov. 8, 1920     4 Sheets-Sheet 1
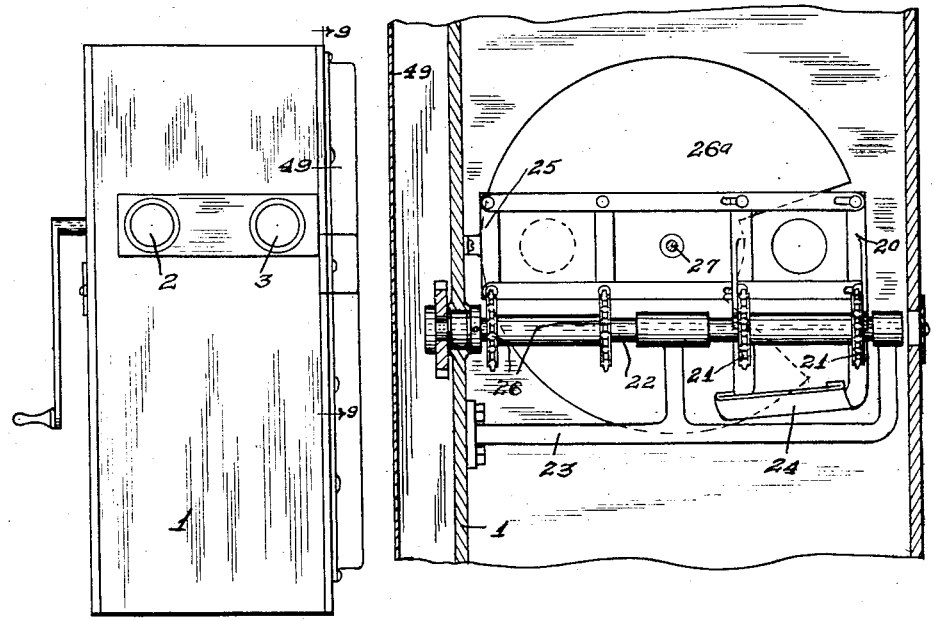
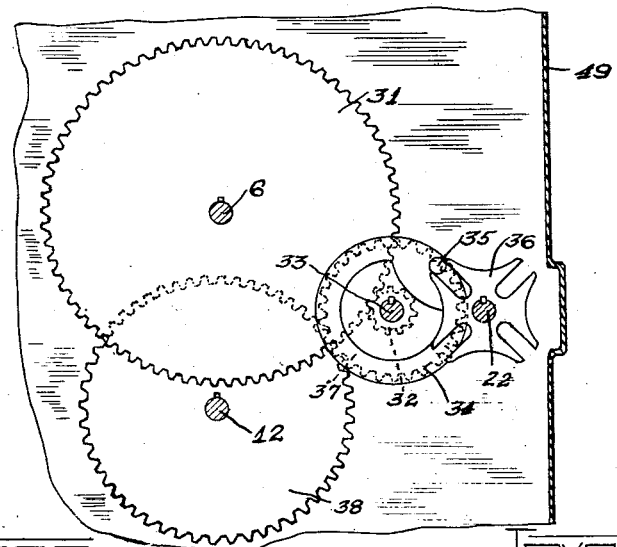

July 14, 1925.  
A. J. MACY  
1,545,589  
STEREOSCOPIC MOTION PICTURE APPARATUS  
Filed Nov. 8, 1920 4 Sheets-Sheet 2
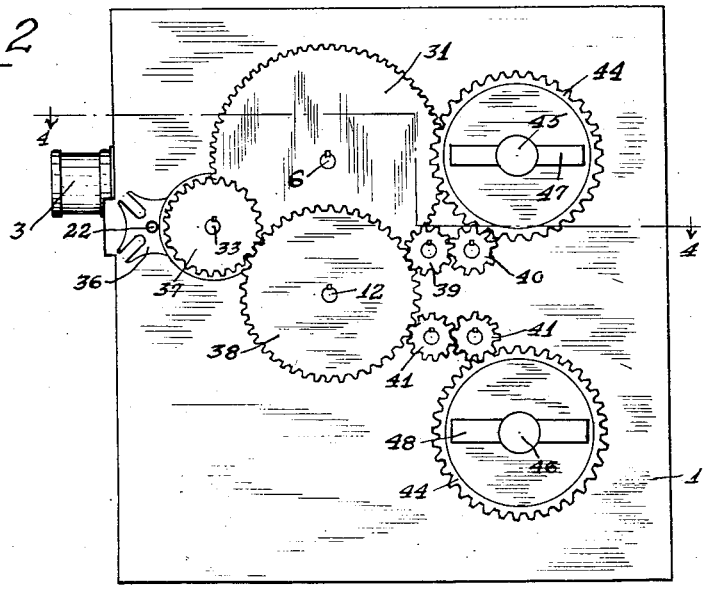
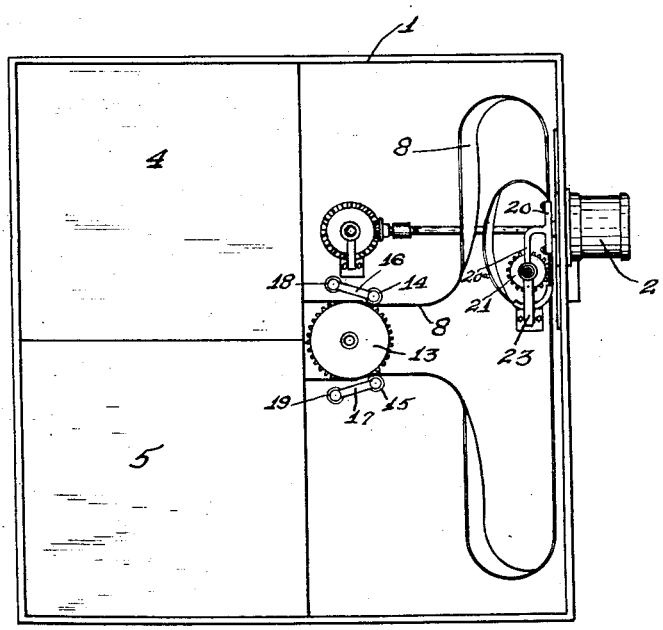

July 14, 1925.
A. J. MACY
1,545,589
STEREOSCOPIC MOTION PICTURE APPARATUS
Filed Nov. 8, 1920 4 Sheets-Sheet 3
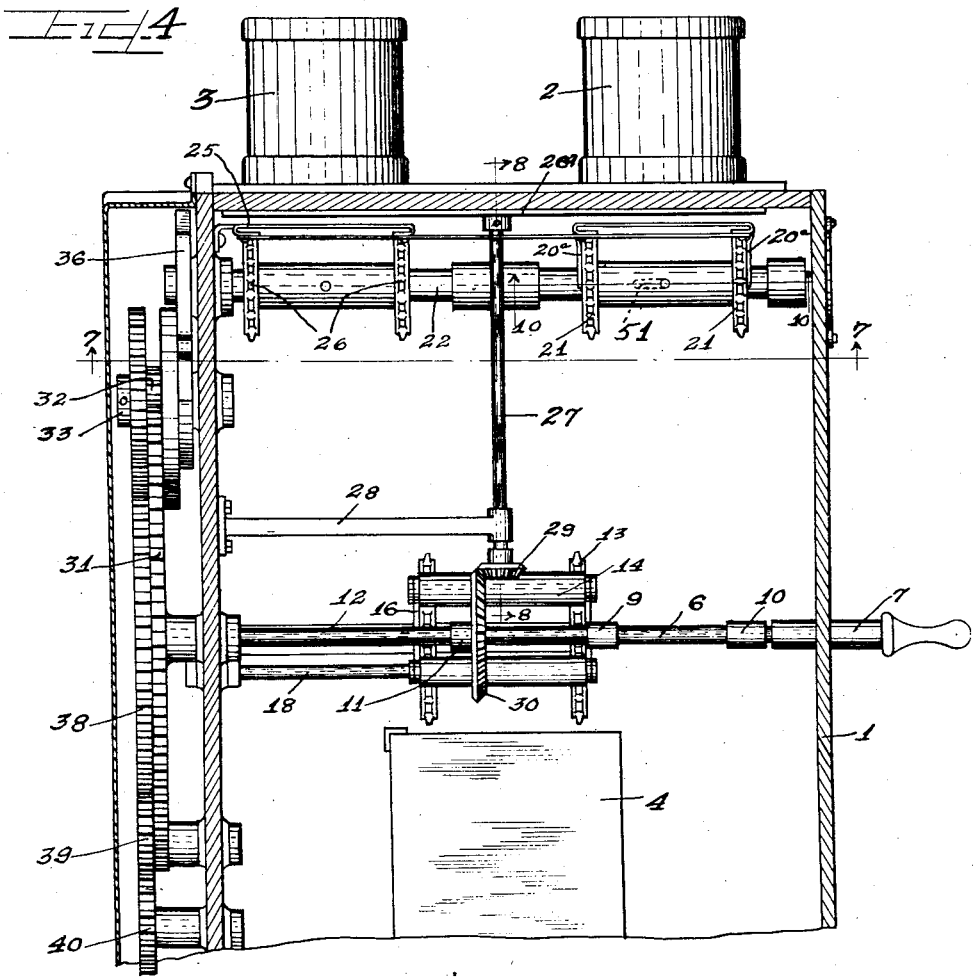
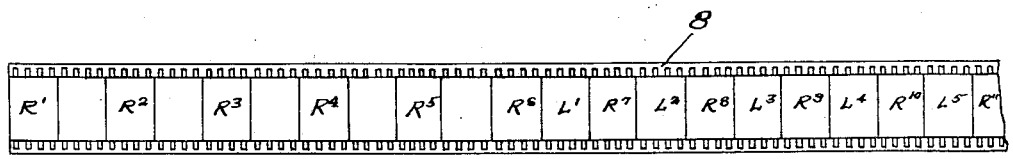

July 14, 1925.
A. J. MACY
1,545,589
STEREOSCOPIC MOTION PICTURE APPARATUS
Filed Nov. 8, 1920     4 Sheets-Sheet 4
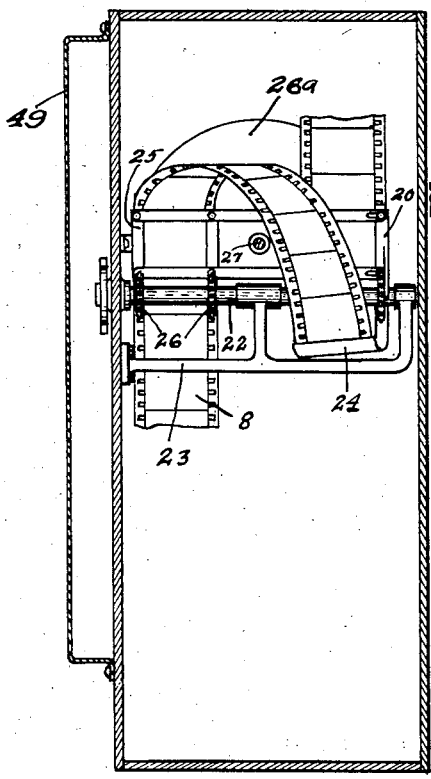
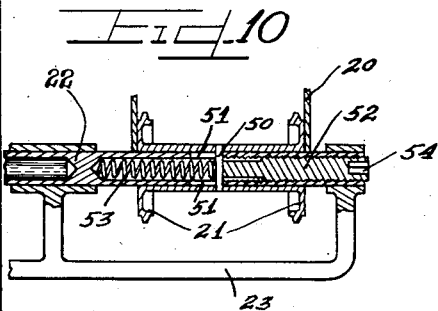
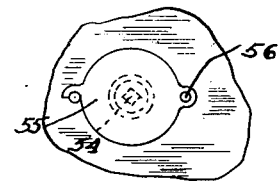
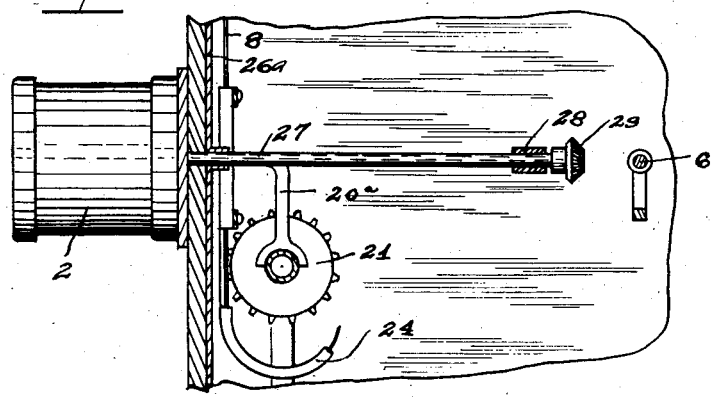
Witnesses
Rudolph T. Berg
Inventor
Alfred J. Macy
By Charles O. Hills Atty.

Patented July 14, 1925.

1,545,589

UNITED STATES PATENT OFFICE.

ALFRED J. MACY, OF CHICAGO, ILLINOIS.

STEREOSCOPIC MOTION-PICTURE APPARATUS.

Application filed November 8, 1920. Serial No. 422,540.

*To all whom it may concern:*

Be it known that I, ALFRED J. MACY, a citizen of the United States, and a resident of the city of Chicago, in the county of Cook and State of Illinois, have invented certain new and useful Improvements in a Stereoscopic Motion-Picture Apparatus; and I do hereby declare that the following is a full, clear, and exact description of the same, reference being had to the accompanying drawings, and to the numerals of reference marked thereon, which form a part of this specification.

This invention relates to a stereoscopic motion picture apparatus and particularly to a stereoscopic motion picture camera which is adapted to photograph the complementary images of stereoscopic pictures through a pair of horizontally spaced lenses directly upon a single strip of film as it is moved therethrough, said images being adapted for subsequent projection through an apparatus similar to the taking camera, having lenses of complementary colors. These images consequently appear on the screen in superposed relation in complementary colors and due to the fact that the interval between the appearance of successive images is too short to be perceived by the eye, the picture on the screen will be in effect stereoscopic when viewed through colored screens which shut out one of the complementary colors from the right eye and the other from the left eye of the observer.

Since it is possible to obtain stereoscopic pictures in this manner, it will be apparent that if the registration or the relative position of one of the complementary views with respect to the position of the other view of the film be changed by causing said view to be shifted to the right or to the left, the picture when projected on the screen will appear to be positioned forwardly or rearwardly thereof in accordance with the amount and direction of registration.

This invention contemplates the attainment of the above outlined result in a superior manner and one of the objects thereof is to provide a stereoscopic motion picture apparatus which is adapted to photograph complementary images of a stereoscopic picture alternately through a pair of horizontal lenses and directly upon a single strip of film.

It is another object of this invention to provide a stereoscopic motion picture apparatus wherein a strip of film is moved vertically in rear of a pair of horizontal lenses and wherein a shutter alternately exposes said film through one of the lenses at the same time completely shutting off the other lens.

It is a further object of this invention to provide a stereoscopic motion picture apparatus which is of simple construction and an adaptation of standard apparatus now in use.

It is an important object of this invention to provide a stereoscopic motion picture apparatus wherein the photographing of complementary images of a stereoscopic picture in a desired registration may be efficiently and conveniently accomplished.

Other and further important objects of this invention will be apparent from the disclosures in the specification and the accompanying drawings.

The invention (in a preferred form) is illustrated in the drawings and hereinafter more fully described.

On the drawings:

Figure 1 is a front elevation of a stereoscopic motion picture camera constructed according to the principles of this invention.

Figure 2 is a side elevation of the same with the cover plate for the gears removed.

Figure 3 is a side elevation of the opposite side of the camera with one of the side plates removed showing interior mechanism.

Figure 4 is an enlarged fragmentary section on the line 4—4 of Figure 2.

Figure 5 is a diagrammatic view of the strip of film.

Figure 6 is an enlarged fragmentary vertical section showing the shutter and film guides.

Figure 7 is a section on the line 7—7 of Figure 4.

Figure 8 is an enlarged fragmentary section on the line 8—8 of Figure 4.

Figure 9 is an enlarged fragmentary section on the line 9—9 of Figure 1.

Figure 10 is an enlarged fragmentary section on the line 10—10 of Figure 4.

Figure 11 is a detail of the entrance to the adjusting mechanism.

As shown on the drawings:

The apparatus of this invention is particularly adapted to employ many of the standard parts of motion picture cameras in use at the present time and comprises in general a casing or box 1 and at one end of said casing 1 a pair of horizontally aligned lenses 2 and 3 are mounted at the proper distance from each other to maintain the images of objects photographed therethrough in proper stereoscopic relation. In the end of the casing 1, opposite the lenses 2 and 3, film magazines 4 and 5 are provided and are adapted to receive and rotatably support reels of unexposed and exposed film respectively in a manner which will be described hereinafter. Journalled transversely of the casing 1 in front of the magazines 4 and 5 is a main driving shaft 6, and a crank 7 secured to one end of said driving shaft outside the casing 1 affords means for rotating the same. The method of advancing the film through the machine and guiding the same into position in rear of the lenses 2 and 3 will now be described.

Journalled in the casing 1 beneath the driving shaft 6 and supported by bearings 9, 10 and 11 on said shaft 6 is a shaft 12 and mounted on said shaft adjacent the front end of the film magazines 4 and 5 is a toothed roller 13 which is adapted to engage apertures in a strip of film 8 which is led over the same in an outward direction from the magazine 4 and under the same in an inward direction into the magazine 5. For holding said strip of film 8 in engagement with the teeth on said roller 13, a pair of presser rolls 14 and 15 are provided and on said presser rollers are supported arms 16 and 17 which are mounted on the ends of rods 18 and 19 extending outwardly from the side of the casing 1.

The strip of unexposed film 8 is led outwardly from the magazine 4 over the toothed roller 13 and from said roller 13 it is conveyed downwardly in rear of the lens 2 through a guiding frame 20 and over a toothed roller 21 which is adjustably mounted on a transverse shaft 22 rotatably supported in bearings on a bracket 23 which is supported on the inside of the casing 1. After engaging the toothed roller 21 the strip of film 8 is directed upwardly and toward the rear of the lens 3 by means of a shield 24 which is clearly shown in Figures 6 and 7, and said film is subsequently led downwardly in rear of said lens 3 through a rigidly mounted frame 25 and over a toothed roller 26 on the shaft 22. The strip of film 8 which has now passed in rear of both of the lenses 2 and 3 and portions of which have been separately exposed through said lenses is led downwardly under the toothed roller 13 between said roller and the presser roller 15 into the receiving magazine 5.

In order that light may be alternately admitted to said lenses 2 and 3 and in order that both of said lenses may be closed during the period when the film is being moved into position therebehind, a rotatably mounted disk shutter 26$^a$ is provided between said lenses and the frames 20 and 25 and a segment removed from said shutter provides an opening for the admission of light therethrough on the film. Said shutter 26$^a$ is mounted on a shaft 27 journalled in the casing 1 midway between the lenses 2 and 3, and the other end of said shaft is journalled in a bracket 28 secured to the inside of the casing 1. Mounted on the inner end of said longitudinal shaft 27 is a bevel pinion 29 which meshes with a bevel gear 30 mounted on the drive shaft 6 and affords a drive whereby the shaft 27 and the shutter 26$^a$ are rotated from said drive shaft 6. Advancement of the strip of film 8 through the machine in proper time with the rotation of the shutter 26 is also effected by the rotation of the shaft 6 and the driving means whereby this is accomplished will now be described.

Keyed on the end of the driving shaft 6 outside the casing 1 is a large driving gear 31 which meshes with a pinion 32 mounted on a stub shaft 33 extending outwardly from the casing 1 near the upper corner thereof. Secured on said stub shaft 33, inside the pinion 32 and rotatable therewith, is a ring plate 34 which has a pin 35 projecting inwardly from the face thereof and said pin 35 is adapted to engage a Geneva gear 36 keyed on the outer end of the shaft 22 and to thereby rotate said shaft 22 to intermittently advance the strip of film 8 into position behind the lenses 2 and 3 at the time both of said lenses are closed by the shutter 26$^a$. Also mounted on said stub shaft 33 and outside the pinion 32 is a gear 37 and said gear 37 meshes with a gear 38 keyed on the end of the shaft 12 outside the casing 1 whereby said shaft 12 and the toothed roller 13 thereon are rotated.

Said gear 38 also provides a drive for the film reels in the magazines 4 and 5, and this drive is transmitted from the gear 38 through idler pinions 39, 40, 41 and 42, as clearly shown in Figure 2, to gears 43 and 44 which act to rotate the shafts 45 and 46 on which the film reels are mounted and driven through suitable friction drive mechanisms 47 and 48.

In order that said driving mechanism may be properly lubricated and that the foreign matter be excluded therefrom, a cover plate 49 is provided therefor and said cover plate 49 is conveniently secured to the casing 1 by means of screws or in any other suitable manner.

In the production of stereoscopic pictures it is possible to obtain an effect whereby when the image is viewed stereoscopically it appears to be in a position forwardly or rearwardly of the plane of the actual picture. This effect is obtained by slightly varying the registration of the complementary views which comprise the picture. In the present invention these effects are attained and the registration is varied by shifting the film laterally in rear of one of the lenses while it is maintained in a fixed position relative to the other lens. The mechanism whereby the film is shifted to obtain this effect will now be described. That portion of the shaft 22 on which the toothed roller 21 is mounted is recessed and said roller 21 is designed to be driven by said shaft and at the same time to be adjusted longitudinally thereof by the provision of a pin 50 which extends through a slot 51 in said shaft 12. Since the film guiding frame 20 is provided with extensions 20ª engaged against the outer ends of said toothed roller 21 and is slidable along the shaft 12, said frame will be moved into adjusted position with said roller. The recess in the outer end of the shaft 22 is threaded and engaged therein is a screw 52, the inner end of which engages the pin 50. Said pin 50 is held against the inner end of the screw 52 by means of a coil spring 53 engaged in the recess in the shaft 22, as clearly shown in Figure 10, and due to the action of said coil spring the film guide frame 20 and the toothed roller 21 are moved outwardly on the shaft 22 as far as the engagement of the screw 52 with the pin 50 will allow. A squared recess 54 is provided in the end of the screw 52 and affords means whereby a key may be inserted through the side of the casing 1 to rotate the screw to adjust the position of the roller 21 and the guide frame 20 on the shaft 22. Access to said squared recess 54 may be had through an opening in the side of the casing 1 which is normally covered by a sliding door 55 which is pivoted at 56, as clearly shown in Figure 11.

Figure 5 is a diagrammatic view of a part of the strip of film 8 showing the relative arrangement of the complementary right and left eye views of the stereoscopic pictures thereon, the former being represented by the character "R" and the latter by "L". It will be noticed from an examination of Figure 5 that the complementary views of each separate picture are spaced apart a certain definite number of spaces on the film and this number of spaces is equal to the amount of film in the loop between the guide frames 20 and 25.

The operation is as follows:

Film upon which exposures are to be made is led outwardly from the magazine 4 over the toothed roller 13 between the top of said roller and the presser roller 14 and from said roller 13 is led upwardly and engaged in the upper edge of the guide frame 20 whence it is led downwardly in rear of the lens 2, being drawn past said lens 2 by the adjustable toothed roller 21. Leaving said roller 21 the film is turned upwardly by the shield 24 forming a half turn loop, as clearly shown in Figure 7, and the film from said loop is led downwardly through the film guide frame 25 in rear of the lens 3, and is drawn past said lens by the toothed roller 26. Exposed film leaving the roller 26 is led backwardly between the roller 13 and the presser roller 15 on the underside thereof into the receiving magazine 5, and is wound on the reel on the shaft 46 therein. The rotating shutter 26 and the film advancing mechanism are all driven from the shaft 6, which is rotated by the crank 7, and the segmental opening in the shutter and the Geneva gear 36 are so constructed with reference to the driving mechanism that exposures are alternately made through the lenses 2 and 3 on the film and so that both of said lenses are closed by the shutter during that part of the operation when the film is being moved into position in rear of said lenses.

The provision of a mechanism for shifting the film laterally in rear of one of the lenses makes possible the varying of the registration of complementary images on the film and the consequent provision of stereoscopic pictures which may be made to appear either in front of or in rear of a reference plane or the actual plane on which the picture is projected. On account of the provision of a mechanism whereby this shifting of the film may be manually effected from the outside of the camera, it is possible to vary this effect by changing the registration during the taking of the picture and in this way many unique results may be obtained. On account of the improved construction employed, many standard parts of motion picture cameras now in use may be used in the commercial adaptation of the apparatus of this invention. In this manner an economical construction is provided.

While there has been shown and described herein an apparatus which is designed to perform the functions of a taking camera, it will be readily apparent that the same apparatus equipped with minor modifications may be used for projecting stereoscopic pictures.

I am aware that numerous details of construction may be varied through a wide range without departing from the principles of this invention, and I therefore do not purpose limiting the patent granted otherwise than necessitated by the prior art.

I claim as my invention:

1. A stereoscopic motion picture apparatus comprising a pair of horizontally aligned lenses, a stationary guiding means adjacent one of said lenses, and a laterally shiftable guiding means adjacent the other lense, said two guiding means being adapted to lead a single strip of film past each of the two lenses.

2. A stereoscopic motion picture apparatus comprising a pair of horizontally aligned lenses, guiding and advancing mechanisms adjacent each of said lenses, and means for laterally shifting one of said guiding and advancing mechanisms, said guiding and advancing mechanism being adapted to lead a single strip of film past each of the two lenses.

3. A stereoscopic motion picture apparatus comprising a pair of lenses, a stationary guiding means adjacent one of said lenses, a laterally shiftable guiding means adjacent the other lens, means for adjusting said shiftable guiding means, said guiding means being adapted to lead a single strip of film past each of said lenses.

4. A stereoscopic motion picture apparatus, comprising a stereoscopic pair of lenses, guiding means, one in the rear of each lens, said two means guiding a single strip of film, each of said guiding means being properly positioned relative to its respective lens to cause the images on said film to be in stereoscopic relation, and means operable from the exterior of the device for shifting the film guiding means to change the stereoscopic effect produced by the images.

In testimony whereof I have hereunto subscribed my name in the presence of two subscribing witnesses.

ALFRED J. MACY.

Witnesses:
CARLTON HILL,
EARL M. HARDINE.